US008483227B2

(12) United States Patent
Asano et al.

(10) Patent No.: US 8,483,227 B2
(45) Date of Patent: Jul. 9, 2013

(54) CONTROLLING BANDWIDTH RESERVATIONS METHOD AND APPARATUS

(75) Inventors: Shigehiro Asano, Austin, TX (US); Charles Ray Johns, Austin, TX (US); Matthew Edward King, Pflugerville, TX (US); Peichun Peter Liu, Austin, TX (US); David Mui, Round Rock, TX (US); Jieming Qi, Austin, TX (US)

(73) Assignees: International Business Machines Corporation, Armonk, NY (US); Kabushiki Kaisha Toshiba, Tokyo (JP)

( * ) Notice: Subject to any disclaimer, the term of this patent is extended or adjusted under 35 U.S.C. 154(b) by 2401 days.

(21) Appl. No.: 10/718,302

(22) Filed: Nov. 20, 2003

(65) Prior Publication Data

US 2005/0111354 A1     May 26, 2005

(51) Int. Cl.
*H04L 12/56*     (2006.01)
(52) U.S. Cl.
USPC .................................................. 370/395.41
(58) Field of Classification Search
USPC ........... 370/229, 230, 235, 236, 236.1, 395.4, 370/395.41, 458, 462; 710/240, 241, 244; 709/223, 226, 227, 229
See application file for complete search history.

(56) References Cited

U.S. PATENT DOCUMENTS

| 6,385,678 | B2 * | 5/2002 | Jacobs et al. | 710/113 |
| 6,721,789 | B1 * | 4/2004 | DeMoney | 709/219 |
| 7,149,186 | B1 * | 12/2006 | Hey | 370/232 |
| 7,350,004 | B2 * | 3/2008 | Fukuyama et al. | 710/241 |
| 7,474,670 | B2 * | 1/2009 | Nowshadi | 370/462 |
| 7,538,772 | B1 * | 5/2009 | Fouladi et al. | 345/535 |
| 7,647,444 | B2 * | 1/2010 | Dignum et al. | 710/241 |

* cited by examiner

*Primary Examiner* — Michael Thier
*Assistant Examiner* — Feben M Haile
(74) *Attorney, Agent, or Firm* — James L. Baudino; Matthew B. Talpis

(57) ABSTRACT

Disclosed is an apparatus which operates to substantially evenly distribute commands and/or data packets issued from a managed program or other entity over a given time period. The even distribution of these commands or data packets minimizes congestion in critical resources such as memory, I/O devices and/or the bus for transferring the data between source and destination. Any unmanaged commands or data packets are treated as in conventional technology.

6 Claims, 3 Drawing Sheets

CONTROLLING BANDWIDTH RESERVATIONS METHOD AND APPARATUS

CROSS-REFERENCED APPLICATIONS

This application relates to co-pending U.S. patent applications entitled "Centralized Bandwidth Management Method and Apparatus" Ser. No. 10/674,977 in the names of Jeffrey Douglas Brown, Scott Douglas Clark, and John David Irish, filed on Sep. 30, 2003, and "Distributed Control Load Shaping Method and Apparatus" Ser. No. 10/718,936 in the names of Jeffrey Douglas Brown, Michael Norman Day, Charles Ray Johns, Thuong Quang Truong, and Takeshi Yamazaki, filed concurrently herewith.

TECHNICAL FIELD

The present invention relates to controlling computer program access to a given resource to minimize congestion in the use of that resource and, more particularly, to controlling computer program access to a given resource to minimize congestion in the use of that resource by other programs.

BACKGROUND

In any computer system, there are limited resources (such as memory) in which tasks or functions must share. The term bandwidth, as used herein, refers to the conventional microprocessors, the way resources are managed is directly proportional to the performance of the system. When several competing programs in a PU (processor unit) are simultaneously trying to access a common resource, such as memory, all programs other than the one succeeding in accessing the resource are put on hold until the present program is through or the OS (operating system) forces a change. The competition for a resource can be even worse in a multiprocessor environment where programs in many different PUs can be simultaneously attempting access to a given resource.

Therefore there is a need to control when a program accesses a heavily used resource, such as a common bus, memory, a given I/O (input/output) device and so forth in a manner that addresses at least some of the problems associated with conventional systems. There is a further need to proportionally distribute access over a predetermined operational period in a manner that addresses at least some of the problems associated with conventional systems.

SUMMARY OF THE INVENTION

The present invention provides for dynamic bandwidth management for proportionately distributing resource allocation within a time period as a function of an executing task. System commands are tagged with a bandwidth identifier. Bandwidth limits are set for resources with programmable hardware registers. Commands are issued to managed resources. A hardware bandwidth management system is established that indicates how the managed resources can be used during a programmable time slice. Commands are issued to unmanaged resources.

BRIEF DESCRIPTION OF THE DRAWINGS

For a more complete understanding of the present invention, and its advantages, reference will now be made in the following Detailed Description to the accompanying drawings, in which.

DETAILED DESCRIPTION

In the remainder of this description, a processing unit (PU) can be a sole processor of computations in a device. In such a situation, the PU is typically referred to as a CPU (central processing unit). In multiprocessor systems, one or more PUs can be utilized as a central or main control unit for the purpose of distributing tasks to other PUs. However in the remainder of this document, all processing units will be referred to as PUs In the following discussion, numerous specific details are set forth to provide a thorough understanding of the present invention. However, those skilled in the art will appreciate that the present invention can be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein can be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
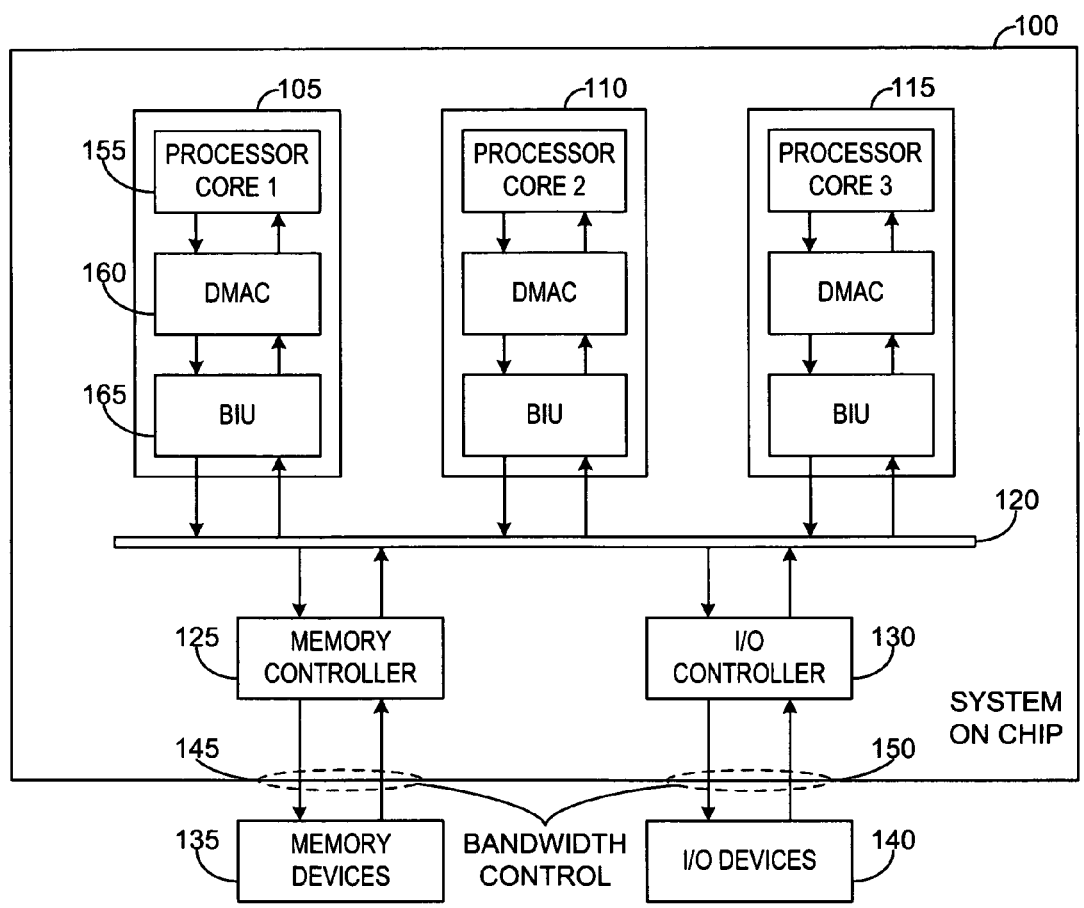
FIG. 1 is a block diagram of a plurality of computer processing units communicating with a plurality of resources.

In FIG. 1 a block 100 is illustrative of a system on a chip. Block 100 includes at least a plurality of PUs 105, 110 and 115 along with a communication path or bus 120 to which each of the PUs are connected. Also shown within block 100 is a memory controller 125 and an I/O controller 130. A block 135 representing one or more memory devices is shown external to the chip 100 as is a block 140 comprising one or more I/O devices. A pair of dash lines 145 and 150 is used to illustrate the fact that a bandwidth control mechanism is operating to reduce congestion for accesses to memory 135 and the I/O devices 140.

Within block 105 there is shown a processor core block 155, a DMAC (direct memory access controller) 160 and a BIU (bus interface unit) 165. Similar blocks are contained in blocks 110 and 115 but are not numerically designated. The bandwidth control mechanism is provided by hardware within each of the DMAC blocks such as 160. While the bandwidth control function can also be performed by software, such control would be to slow for many applications.

Figure 2:
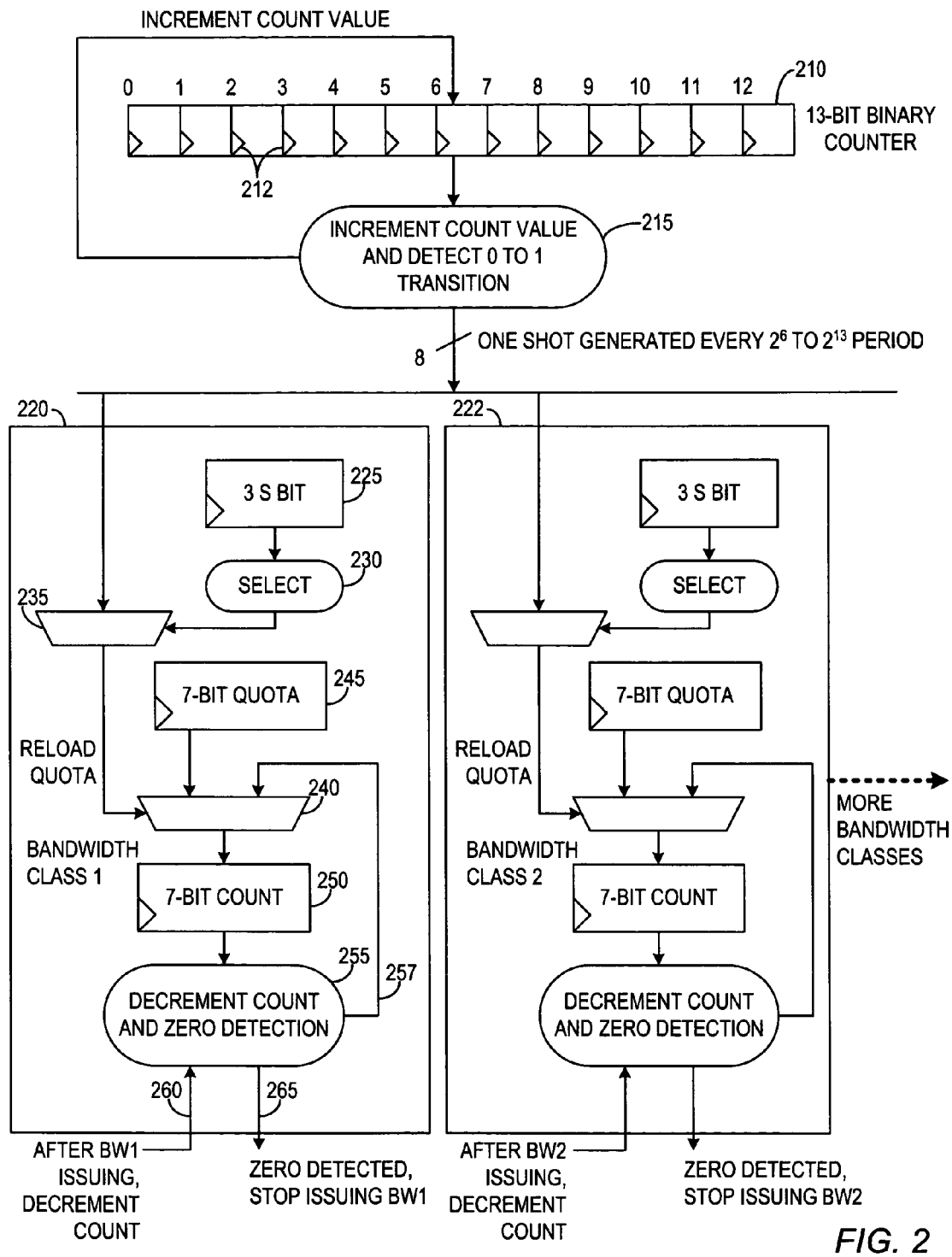
FIG. 2 is a combination hardware block and flow diagram illustrating how a bandwidth controller can attempt to control congestion by distributing commands of a given class over an operational time period.

The bandwidth control mechanism is presented in FIG. 2 with a counter 210 at the top. Each of the triangles 212 within counter 210 are representative of latches to hold the output until the next count value. The bit positions are numbered with the "0" bit position being representative of $2^{13}$ or 8192 clocks. The "7" bit position is representative of $2^6$ and thus performs a 0-to-1 transition every 64 clock cycles. A block 215 operates to both feedback an incremental count signal to counter 210 and to detect a 0-to-1 transition of a bit position. (For the purposes of FIG. 2, a 1-to-0 transition is ignored by block 215.) While an 8 bit output of block 215 can be connected to a large plurality of bandwidth class control mechanisms, only two blocks 220 and 222 are shown.

The 8 bit output of block 215 comprises the 0-to-1 transitions of the eight most significant bits of counter 210. In other words these bits represent the $2^6$ through the $2^{13}$ bit positions. It can be assumed for the purpose of this invention and description of operation that 8192 cycles of a clock is an operational time period although submultiples of this time frame can also be designated as operational time periods or windows of the 8192 clock cycles.

Within block 220 the is shown a multiplexer type gate 235 receiving the 8 bit input from block 215. There is also shown a programmable S bit block 225 which can be programmed by a hypervisor, operating system or other software authority in charge of overall bandwidth managed authorizations. Such overall software authority is not shown but is known to those skilled in the art. As shown, in a preferred embodiment, this block 225 is three binary bits in capacity and thus can be programmed to be any of 8 values. A block 230 uses the value contained in block 225 to select one of the bits applied to the multiplexer 235 and apply the selected bit to a further multiplexer type gate 240 whenever the selected bit incurs a 0-to-1 transition.

A 7 bit quota block 245 provides a preprogrammed count into the gate 240. Thus 128 different values can be inserted or programmed into register 245. An output of gate 240 supplies either the quota value from register 245 or the value from lead 257. The output of counter 250 is supplied to a zero count detection and decrementer block 255 which provides a feedback to 250 via a lead 257 passing through gate 240. The block 255 supplies a 7 bit signal, decremented by one count value, on lead 257 whenever it receives an indication, on an input lead 260, that a command of a given class has been issued. When 260 is inactive, the signal on 257 will maintain the old counter value from register 250. When the count value in register 250 reaches zero, an output signal is supplied on a lead 265 to the mechanism or entity controlling or issuing the given class command to prevent the issuance of any further command of that class until the next operational window when a quota reload signal is obtained from gate 235 by gate 240 to reload the quota from register 245.

It will be appreciated by those skilled in the art, that, if the issuance of commands to the system is controlled in some bandwidth management fashion, the performance of the system can be enhanced without having to provide additional resources such as larger memory, faster memory, multiple memory locations and so forth. The present invention operates to not only control the bandwidth of commands to a given resource but additionally operates to proportionally distribute the resource allocation over a given operational time period such as the 8192 clock cycle of counter 210.

Figure 3:
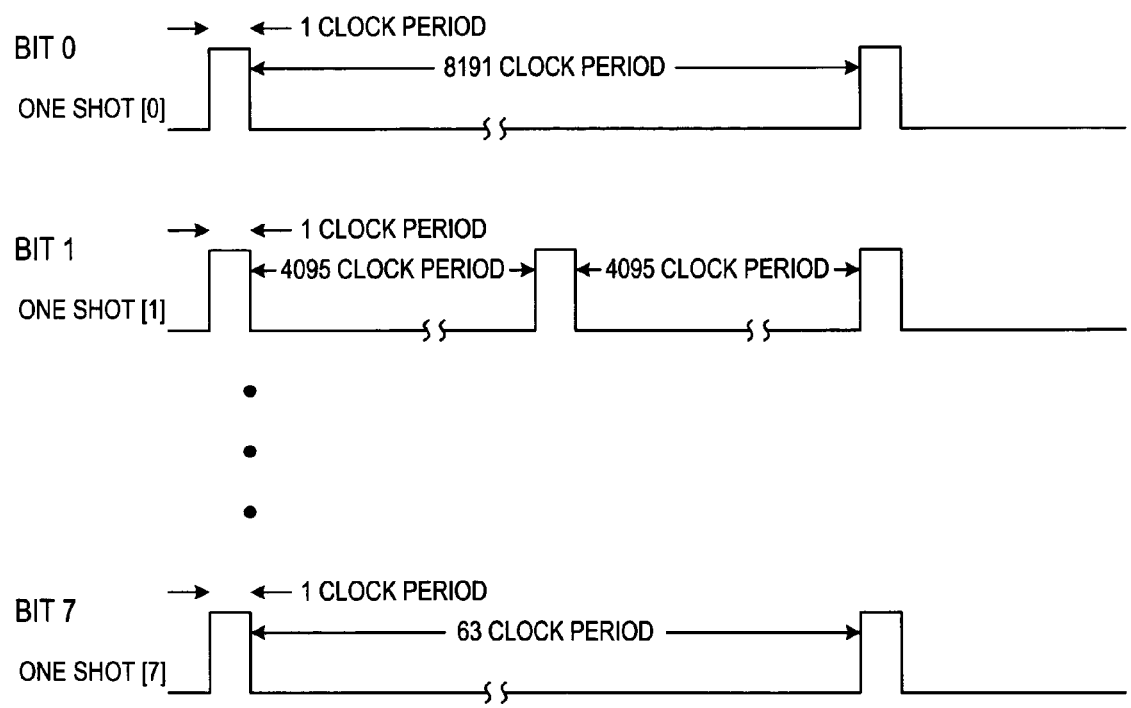
FIG. 3 comprises a set of waveforms used in explaining FIG. 2.

In FIG. 3, the waveforms are not drawn to scale. The upper waveform represents the signal obtained on the first of the eight leads connecting block 215 to each of the blocks 235. The signal of this lead is indicative of the 0-to-1 transitions of the "0" bit every 8192 clock cycles. The next waveform represents the transitions of the bit "1" having a window of 4095 clock cycles. The remaining waveform represents bit "7" and has a window of 64 clock cycles.

In operation, commands in the system can be tagged with a bandwidth identifier as part of a classID accompanying the command. The program or software can get authorization from an authority such as the OS (operating system) to utilize a given bandwidth for each resource or class. The bandwidth for a given classID is set via programmable registers in hardware as represented by the above referenced registers 225 and 245. In a preferred embodiment of the invention, there can be both managed and unmanaged resources and thus managed and unmanaged commands. Non-managed resources would be those that the running program does not care about. In other words, bandwidth management for some resources are not considered important by the author of the program. Alternatively, a system can be designed in accordance with this invention, where the OS determines which resources need to have bandwidth control and all commands affecting that resource would be managed.

In explaining the operation of this invention, it can be assumed that the time period elapsing for the counter 210 to complete one full count of 8192 incremental steps or clocks comprises one operational time period over which many resources can managed. These resources will typically be managed over many operational time periods and the bandwidth utilized for the various resources can be the same or different. For each managed resource, there is an S register like the 3 bit register designated as 225. The bits in the S register 225 are used to select a given bit transition, within the 13 bit counter 210, for reloading quota bits to obtain the actual bandwidth count value. The quota bits are programmed into one of the 7 bit registers like the register 245. As can be ascertained, the most significant or "0" bit, in counter 210, only transitions from 0 to 1 one time each operational time period.

The next most significant, or "1", bit transitions twice from 0-to-1, in this period, as shown in FIG. 3. The next most significant, or "2", bit transitions 4 times in this period and so forth. The counter 210 is always counting. When the one shot signal selected by S-Register 225 is active, the corresponding counter 250, is reloaded with the value programmed into the quota register such as 245. Typically this value will remain constant throughout the running of the program but the program could request a different bandwidth for a given resource for different sections of the program. It would be likely however that the OS or other authority giving authorization would utilize a different bandwidth class control mechanism block for the new classID commands.

An example will now be given of a program requesting a bandwidth equivalent to 32 commands every operational time period of 8192 clocks. If "000", representative of the most significant bit, were inserted in block 235, and a base 10 value of 32 were inserted in register 245, the counter 250 would stop allowing the command source further requests once 32 requests were issued. The problem with such a setup is that in some circumstances, all 32 requests could be issued in a short time period such as say the first 512 of the 8192 clocks of the operational time period. Obviously this bunches the requests and potentially interferes with other requests sources. This burst of commands can prevent another program from accessing the resource in time.

In view of the above, an alternative approach provided by this invention will now be explained. Since the counter 210 repeats every 8192 clocks, it can be determined that bit "5" (the sixth most significant bit transitions from 0-to-1) 32 times during an operational time period or every 256 clock cycles. If encoding is set such that "000" is equal to the most significant bit or in other words bit "0" and "111" is equal to bit "7", then loading the register with "101", which is equivalent to bit "5", will cause a signal to be output from gate 235 on the lead labeled "reload quota" every time bit "5" transitions from 0-to-1. Thus a window of 256 cycles is created. Further, the quota in block 245 should be programmed or set to "0000001" (a base 10 value of 1").

In this manner the use of the resource can be spread out. With this setup, the program is only allowed to issue one command every 256 counts of the counter 210 and other programs or entities using the resource are not as likely to find the resource congested. In the preferred embodiment, the program, or some other intermediate control entity, will check the value of the signal on lead 265 before issuing any commands. Once the command is issued, block 255 provides the 7-bit decremented value on lead(s) 257 to gate 240 whereby the count in counter 250 is reduced from one to zero. The detection of zero, in the output of counter 255, will cause the signal on lead 265 to change and prevent the issuance of any more commands from that program to the protected resource.

The same example of bandwidth could use bit "4" of counter 210 to reload the quota register 245 and a setting of "0000010" (base 10 value of 2) in register 245. This approach will allow the program to issue 2 commands every 512 clock cycles. This would not be as evenly distributed across the operational time period as that presented in the above paragraph but would be better than the burst of commands possible in the first mentioned example.

While the discussion above has been in the terms of commands and resources like memory, the resource to be protected or controlled can just as well be the bus 120 and the items being bandwidth limited can be any informational packet whether a data packet or a command. The main thrust of this invention is to present a method whereby access to a given managed resource, via issued commands or other informational packets, is evenly distributed over a given time period instead of being allowed to have these commands or data packets be issued in a "burst" thereby creating the potential of congestion at a resource and minimizing the possibility of "bottle necks" from occurring and preventing other programs from timely completing their tasks.

The one or more PUs of FIG. 1 can have both managed and unmanaged commands and data packets. Further a given program can be restricted to having all commands managed, if it wants a guaranteed bandwidth or it can be allowed to have unmanaged command directed to some resources and managed commands required to access other resources. A controller within the appropriate block, such as the DMAC 160, will check the classID accompanying each received command or data packet before putting it in an unmanaged or managed queue for further processing.

Although the invention has been described with reference to a specific embodiment, the description is not meant to be construed in a limiting sense. Various modifications of the disclosed embodiment, as well as alternative embodiments of the invention, will become apparent to persons skilled in the art upon reference to the description of the invention. It is therefore contemplated that the claims will cover any such modifications or embodiments that fall within the true scope and spirit of the invention.

What is claimed is:

1. A method for dynamic bandwidth management proportionately distributing resource allocation within a time period as a function of an executing task, comprising:
tagging system commands with a bandwidth identifier;
setting bandwidth limits for managed resources with programmable hardware registers;
checking the bandwidth identifier of the tagged system commands to determine the bandwidth limit of the managed resources to be used for the tagged system commands;
issuing the system commands to the managed resources;
establishing a hardware bandwidth management system comprising a counter that indicates how the managed resources can be used during a programmable time slice based on the bandwidth limits programmed in the hardware registers, the bandwidth limits programmed in the hardware registers indicating a distribution of tagged system commands to the managed resources substantially evenly across the programmable time slice, the bandwidth limits programmed in the hardware registers indicating a bit position of the counter wherein a transition of the bit position based on a corresponding number of clock cycles controls issuance of the system commands to the managed resources; and
providing a feedback to the counter such that a count value is decremented by one, and wherein when the count value reaches zero, the bandwidth management system is prevented from issuance of any further commands until a next operational time period.

2. The method of claim 1, further comprising tagging the system commands with the bandwidth identifier as part of a class ID.

3. A method of minimizing congestion in resource access comprising the steps of:
checking a bandwidth identifier tagged to managed commands;
determining values inserted in programmable registers based on the bandwidth identifiers tagged to the managed commands;
sending predetermined numbers of the managed commands only during times permitted by a bandwidth control mechanism based on the values inserted in the programmable registers, the values indicating a bit position of a counter of the bandwidth control mechanism wherein a transition of the bit position based on a corresponding number of clock cycles controls issuance of the managed commands issued by a program over an operational time period; and
providing a feedback to the counter such that a count value is decremented by one, and wherein when the count value reaches zero, the bandwidth control mechanism is prevented from issuance of any further commands until a next operational time period.

4. The method of claim 3, further comprising sending predetermined numbers of managed commands for a particular class of commands only during times permitted by the bandwidth control mechanism.

5. A computer program product for minimizing congestion in resource access, the computer program product having a computer program embodied on a storage device, the computer program comprising:
computer code for checking a bandwidth identifier tagged to managed commands;
computer code for determining values inserted in programmable registers based on the bandwidth identifiers tagged to the managed commands;
computer code for sending managed commands only during times permitted by a bandwidth control mechanism based on the values inserted in the programmable registers, the values indicating a bit position of a counter of the bandwidth control mechanism wherein a transition of the bit position based on a corresponding number of clock cycles controls issuance of the managed commands issued by a program over an operational time period; and
computer code for providing a feedback to the counter such that a count value is decremented by one, and wherein when the count value reaches zero, the bandwidth control mechanism is prevented from issuance of any further commands until a next operational time period.

6. The computer program product of claim 5, wherein the computer program comprises computer code for sending predetermined numbers of managed commands for a particular class of commands only during times permitted by the bandwidth control mechanism.

\* \* \* \* \*